`US010676058B2`

United States Patent
Ghannam et al.

(10) Patent No.: US 10,676,058 B2
(45) Date of Patent: Jun. 9, 2020

(54) VEHICLE DASHBOARD SAFETY FEATURES

(71) Applicant: Ford Global Technologies, LLC, Dearborn, MI (US)

(72) Inventors: Mahmoud Yousef Ghannam, Canton, MI (US); Dana Conner, Southfield, MI (US); Jeff Hammoud, Dearborn Heights, MI (US); Sami Jarmak, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 606 days.

(21) Appl. No.: 15/203,502

(22) Filed: Jul. 6, 2016

(65) Prior Publication Data

US 2018/0009404 A1    Jan. 11, 2018

(51) Int. Cl.
*B60R 21/02* (2006.01)
*B60R 21/16* (2006.01)
*B60R 21/015* (2006.01)

(52) U.S. Cl.
CPC ........ *B60R 21/02* (2013.01); *B60R 21/01512* (2014.10); *B60R 21/16* (2013.01); *B60R 2021/162* (2013.01)

(58) Field of Classification Search
CPC .... B60R 21/02; B60R 21/16; B60R 2021/162
USPC .......................................................... 701/45
See application file for complete search history.

(56) References Cited

U.S. PATENT DOCUMENTS

| | | | |
|---|---|---|---|
| 5,482,314 A | 1/1996 | Corrado et al. | |
| 6,186,538 B1 | 2/2001 | Hamada et al. | |
| 6,220,627 B1 | 4/2001 | Stanley | |
| 6,272,411 B1 | 8/2001 | Corrado et al. | |
| 6,459,973 B1 | 10/2002 | Breed et al. | |
| 7,983,817 B2 | 7/2011 | Breed | |
| 8,180,547 B2 | 5/2012 | Prasad et al. | |
| 2003/0098909 A1* | 5/2003 | Fritzsche | B60R 1/00 348/148 |
| 2006/0004504 A1 | 1/2006 | Bouladian | |
| 2006/0023918 A1 | 2/2006 | Ertl et al. | |
| 2007/0100525 A1* | 5/2007 | Mattes | B60R 21/01 701/45 |

(Continued)

FOREIGN PATENT DOCUMENTS

| | | |
|---|---|---|
| CN | 201042955 Y | 4/2008 |
| EP | 1552988 A2 | 7/2005 |

(Continued)

OTHER PUBLICATIONS

Search Report dated Dec. 7, 2017 for Great Britain Patent Application No. GB1710881.2 (5 Pages).

(Continued)

*Primary Examiner* — Khoi H Tran
*Assistant Examiner* — Rodney P King
(74) *Attorney, Agent, or Firm* — Frank Lollo; Eversheds Sutherland (US) LLP

(57) ABSTRACT

A vehicle includes: a dashboard with load sensors and airbag(s), a seat, processor(s) configured to: (a) detect load on the dashboard, (b) generate a display based on (a), (c) count time elapsed since (b), (d) activate a vibrating motor of the seat based on (a) and (c), (e) count time elapsed since (d), (f) disable the airbag(s) based on (a) and (e).

16 Claims, 5 Drawing Sheets

(56) References Cited

U.S. PATENT DOCUMENTS

2007/0299586 A1* 12/2007 Griffin .............. B60R 21/01516
  701/45
2008/0243342 A1* 10/2008 Breed ................ B60R 21/0132
  701/45
2015/0127224 A1*  5/2015 Tabe ...................... B60R 22/48
  701/45

FOREIGN PATENT DOCUMENTS

JP   H10100858 A   4/1998
WO   WO 9739920 A1   10/1997

OTHER PUBLICATIONS

*Kia Soul: Occupant Detection System (ODS)* [Online] Retrieved Apr. 19, 2016 from http://www.kisouman.com/occupant_detection_system_ods -418.html (10 Pages).
Unpublished pending U.S. Appl. No. 14/991,496, filed Jan. 8, 2016 a copy of which is not being furnished herewith, pursuant to the Commissioner's Notice dated Sep. 21, 2004.

* cited by examiner

VEHICLE DASHBOARD SAFETY FEATURES

TECHNICAL FIELD

This disclosure relates to vehicle safety systems.

BACKGROUND

Passengers occasionally rest objects on the dashboard. During an unexpected event, such as a crash, the rested objects may become projectiles and pose a safety hazard. If the rested objects are the passenger's feet, and the passenger airbags deploy, then the passenger will be injured. A solution is needed to discourage passengers from resting objects on the dashboard.

SUMMARY

A vehicle consistent with the present disclosure includes: a dashboard with load sensors and airbag(s), a seat, processor(s) configured to: (a) detect load on the dashboard, (b) generate a display based on (a), (c) count time elapsed since (b), (d) activate a vibrating motor of the seat based on (a) and (c), (e) count time elapsed since (d), (f) disable the airbag(s) based on (a) and (e).

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
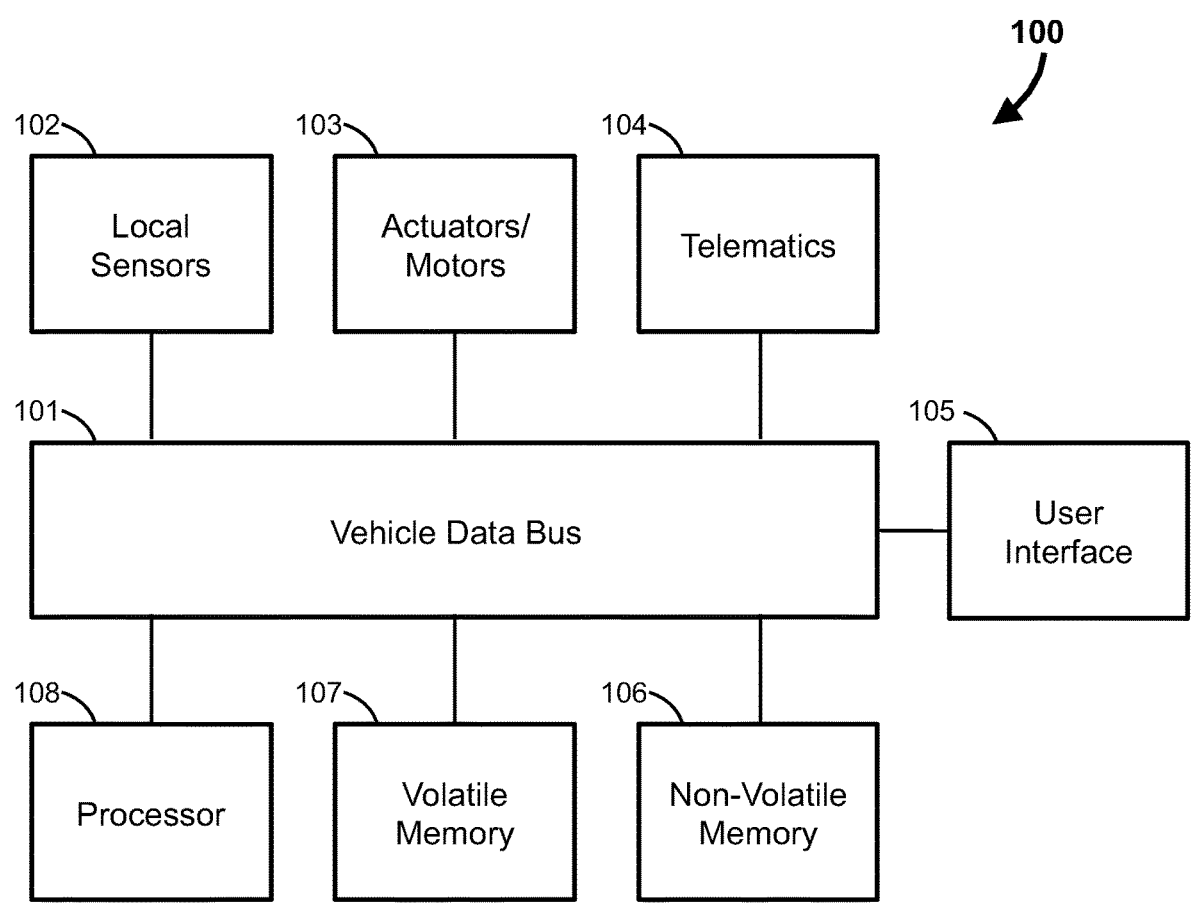
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of an example vehicle 200. The vehicle 200 is also referred to as a first vehicle 200. The vehicle 200 includes a motor, a battery, at least one wheel driven by the motor, and a steering system configured to turn the at least one wheel about an axis. Suitable vehicles are also described, for example, in U.S. patent application Ser. No. 14/991,496 to Miller et al. ("Miller") and U.S. Pat. No. 8,180,547 to Prasad et al. ("Prasad"), both of which are hereby incorporated by reference in their entireties. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The processor 108 may represent multiple processors 108 working sequentially or in parallel. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3 G, LTE), USB, etc. The telematics unit 104 may be configured to broadcast signals at a certain frequency (e.g., one type of vehicle to vehicle transmission at 1 kHz or 200 kHz, depending on calculations described below).

The actuators/motors 103 produce physical results. Examples of actuators/motors include fuel injectors, windshield wipers, brake light circuits, transmissions, airbags, engines, power train motors, steering, seat vibration motors, airbags, etc. The airbags may have a disabled state and an enabled state. When the airbags are in the disabled state, the airbags cannot deploy. When the airbags are in the enabled state, the airbags will deploy in response to signals from the processors. The local sensors 102 transmit digital readings or measurements to the processor 108. Examples of suitable sensors include temperature sensors, rotation sensors, seatbelt sensors, speed sensors, seatbelt sensors, load sensors, cameras, lidar sensors, radar sensors, etc. It should be appreciated that the various connected components of FIG. 1 may include separate or dedicated processors and memory. Further detail of the structure and operations of the computing system 100 is described, for example, in Miller and/or Prasad.

Figure 2:
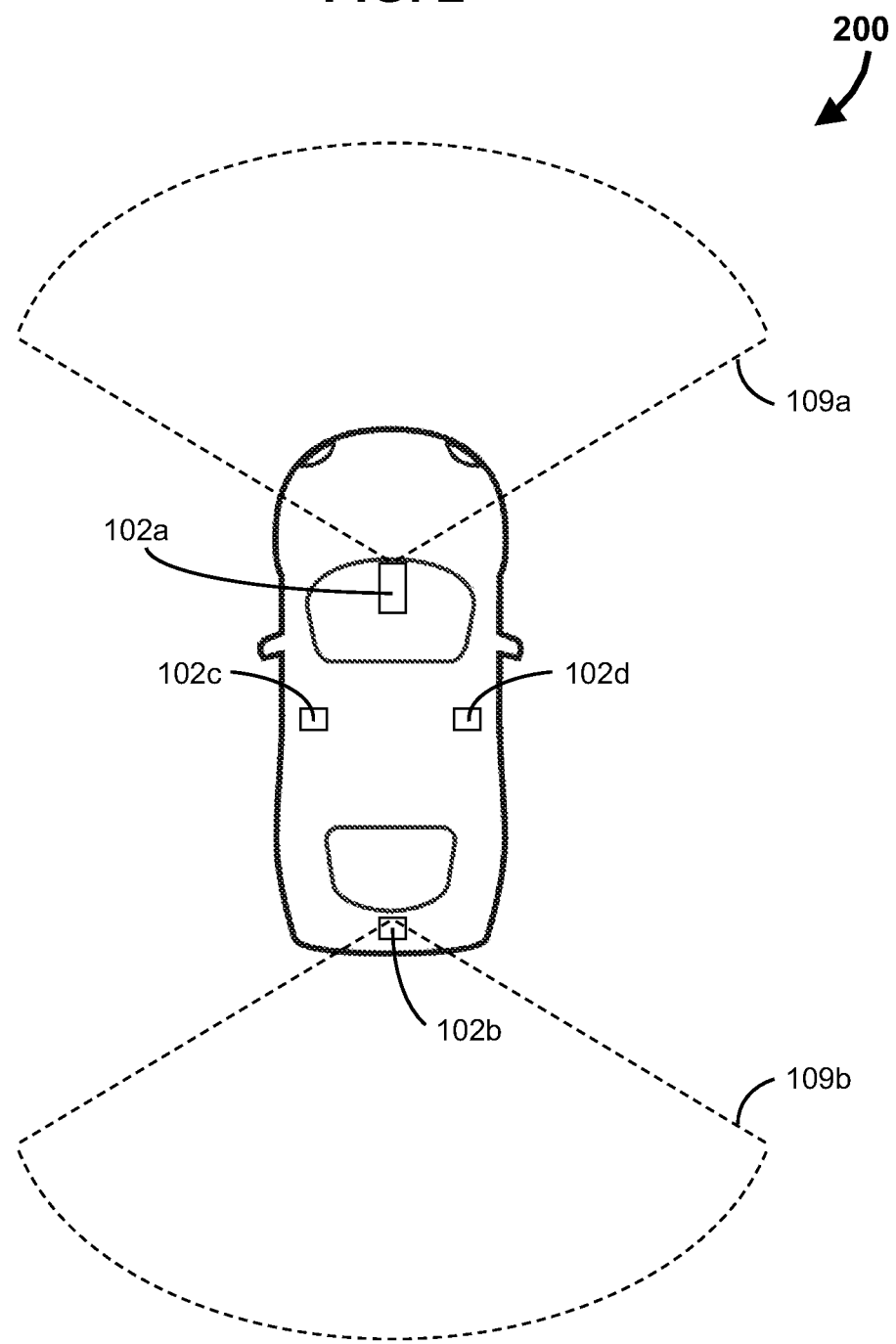
FIG. 2 is a schematic of a vehicle including the vehicle computing system.

FIG. 2 generally shows and illustrates the vehicle 200, which includes the computing system 100. Although not shown, the vehicle 200 is in operative wireless communication with a nomadic device, such as a mobile phone. Some of the local sensors 102 are mounted on the exterior of the vehicle 200. Local sensor 102a may be an ultrasonic sensor, a lidar sensor, a camera, a video camera, and/or a microphone, etc. Local sensor 102a may be configured to detect objects leading the vehicle 200 as indicated by leading sensing range 109a. Local sensor 102b may be an ultrasonic sensor, a lidar sensor, a camera, a video camera, and/or a microphone, etc. Local sensor 102b may be configured to detect objects trailing the vehicle 200 as indicated by leading sensing range 109b. Left sensor 102c and right sensor 102d may be configured to perform the same functions for the left and right sides of the vehicle 200. The vehicle 200 includes a host of other sensors 102 located in the vehicle interior or on the vehicle exterior. These sensors 102 may include any or all of the sensors disclosed in Prasad.

It should be appreciated that the vehicle 200 is configured to perform the methods and operations described below. In some cases, the vehicle 200 is configured to perform these functions via computer programs stored on the volatile and/or non-volatile memories of the computing system 100. A processor is "configured to" perform a disclosed operation when the processor is in operative communication with memory storing a software program with code or instructions embodying the disclosed operation. Further description of how the processor, memories, and programs cooperate appears in Prasad. It should be appreciated that the nomadic device or an external server in operative communication with the vehicle 200 may perform some or all of the methods and operations discussed below.

According to various embodiments, the vehicle 200 includes some or all of the features of the vehicle 100a of Prasad. According to various embodiments, the computing system 100 includes some or all of the features of the VCCS 102 of FIG. 2 of Prasad. According to various embodiments, the vehicle 200 is in communication with some or all of the devices shown in FIG. 1 of Prasad, including the nomadic device 110, the communication tower 116, the telecom network 118, the Internet 120, and the data processing center 122.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Figure 3:
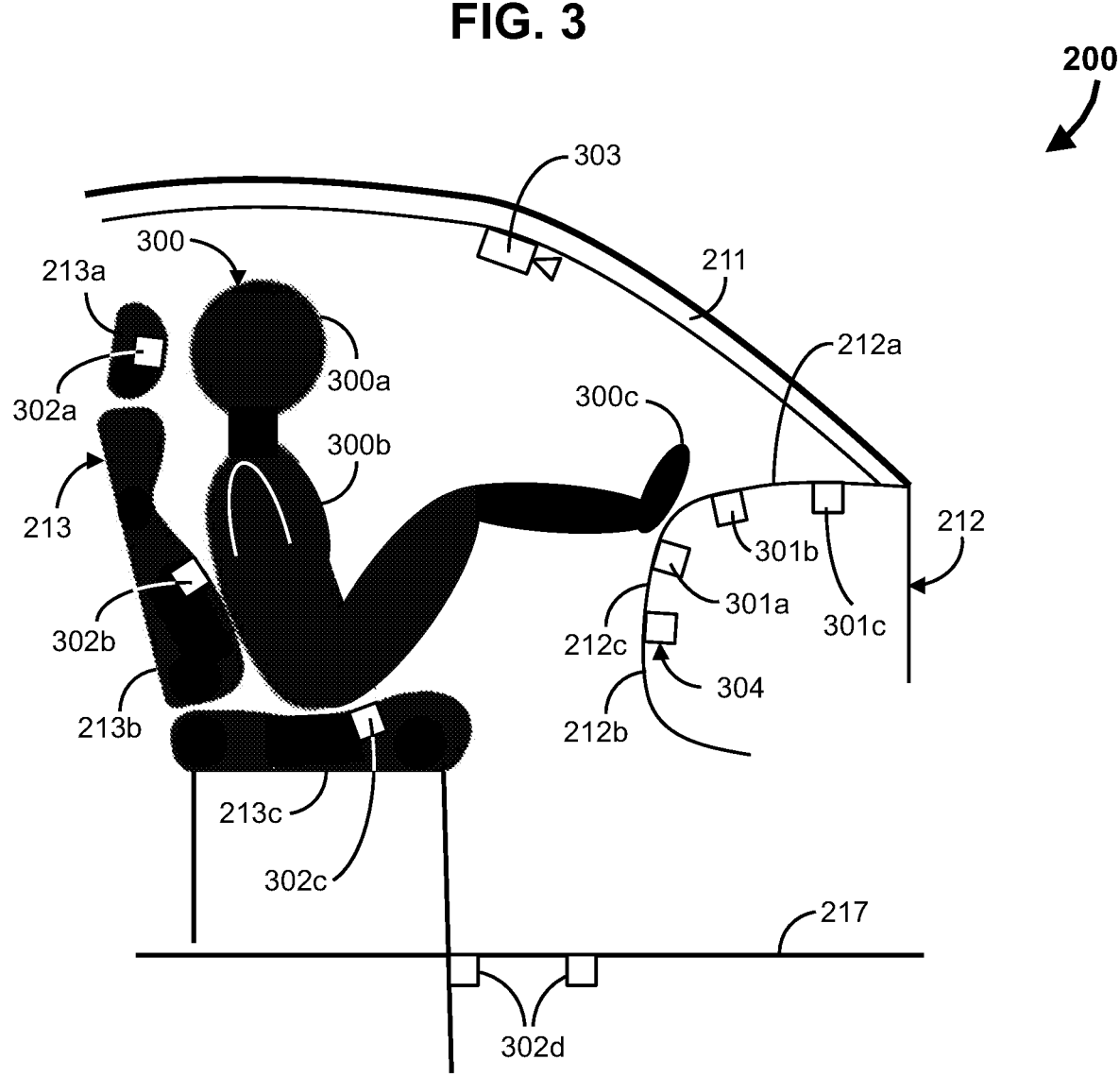
FIG. 3 is a cross sectional side view of the vehicle including a dashboard and a seat.

FIG. 3 generally shows and illustrates front passenger side of the vehicle 200. A person 300 with a head 300a, body 300b, and feet 300c is sitting on a seat 213 that includes a headrest 213a, a back or back rest 213b, and a bottom 213c. The bottom 213c is connected to a floor 217 of the vehicle 200 via suitable supports. The vehicle 200 includes a dashboard 212 below the windshield 211 and transversely extending (i.e., from the passenger side to the driver side) across the vehicle 200 under the windshield 212. The dashboard includes user interfaces 105 such as climate control, gauges, touchscreen displays, switches, lights, etc. The dashboard 212 includes a passenger side airbag 304 and a driver side airbag (not shown). It should be appreciated that the airbags (e.g., passenger side airbag 304) may represent a plurality of passenger side airbags positioned around the passenger. The dashboard 212 includes a top panel 212a joined to a side panel 212b along an interface 212c. The feet 300c are exerting a horizontal load on the dashboard 212. The dashboard 212 is purely exemplary and may be defined by more panels or a single panel.

The seat 213 includes seat load sensors 302a, 302b, and 302c. The dashboard includes dashboard load sensors 301a, 301b, and 301c. The floor 217 includes floor load sensors 302d. A camera 303 is pointed at the dashboard 212. The load sensors 301, 302 and the camera 303 are local sensors 102 and are thus wired or wirelessly connected to the processor 108 as schematically shown in FIG. 1.

Figure 4:
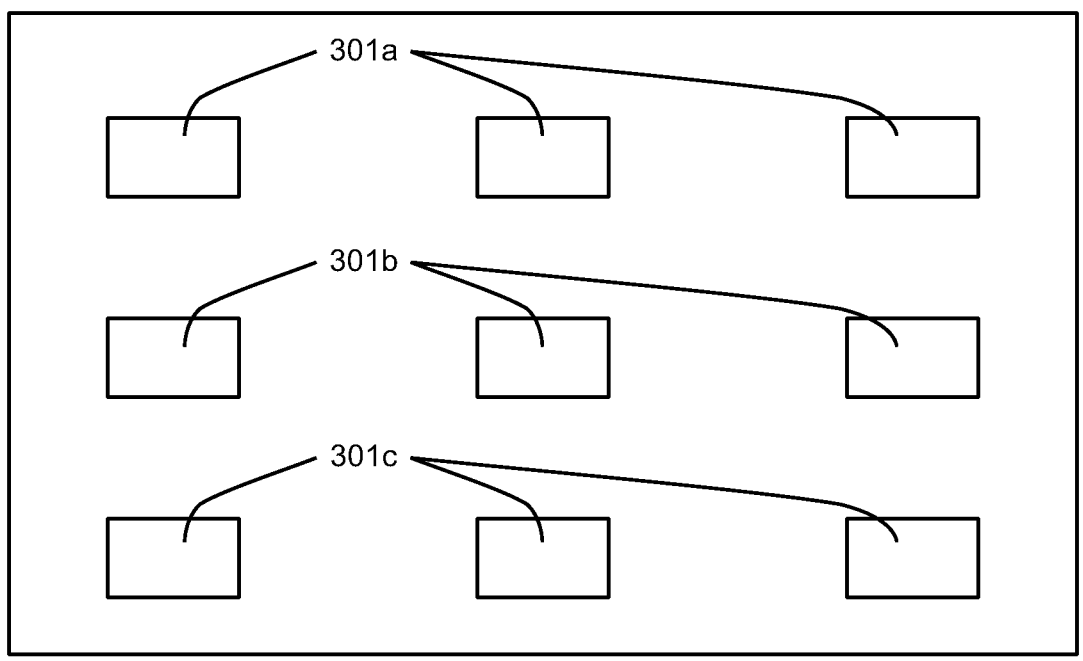
FIG. 4 is a cross sectional top view of a top panel of the dashboard.

FIG. 4 is a top view of the top panel 212a. As shown in FIGS. 3 and 4, the top panel 212a may be configured to transmit mechanical load (e.g., weight) to a plurality of dashboard load sensors 301a, 301b, 301c. As shown in FIG. 3, some of the load sensors (e.g., dashboard load sensors 301b and 301c) may be configured to sense a vertical mechanical load. A vertical mechanical load would occur when a passenger rested feet 300c or an object on top of the dashboard (e.g., above top panel 212a). Some of the sensors (e.g., dashboard load sensors 301a) may be configured to sense a horizontal mechanical load. A horizontal mechanical load would occur when a passenger pressed feet 300c against the dashboard, as shown in FIG. 3.

As shown in FIG. 4, the top panel 212a may include a plurality of rows and columns of load sensors 301a, 301b, 301c. It should be appreciated that additional load sensors 301 may be attached to side panel 212b and any other surface of the dashboard. It should be appreciated that floor load sensors 302d and/or seat load sensors 302a, 302b, 302c may be arranged in a plurality of rows and columns similar to dashboard load sensors 301a, 301b, 301c.

The load sensors 301, 302 may be weight or mass sensors that apply a resistive-based design, a capacitance design, a force load cell design, a pressure-based design, or any other design capable of sensing weight and/or mass. According to various embodiments, the load sensors 301, 302 are configured to transmit a voltage level to the processor 108 based on a degree of load. Suitable load sensors 301, 302 are known in the art. It should be appreciated that when the disclosure and claims refer to "weight," the disclosure and claims also contemplate "mass." For example, a "weight sensor" should be understood to include be a "weight sensor" or a "mass sensor" and a system configured to "measure weight" should be understood to "measure weight" or "measure mass," etc.

Figure 5:
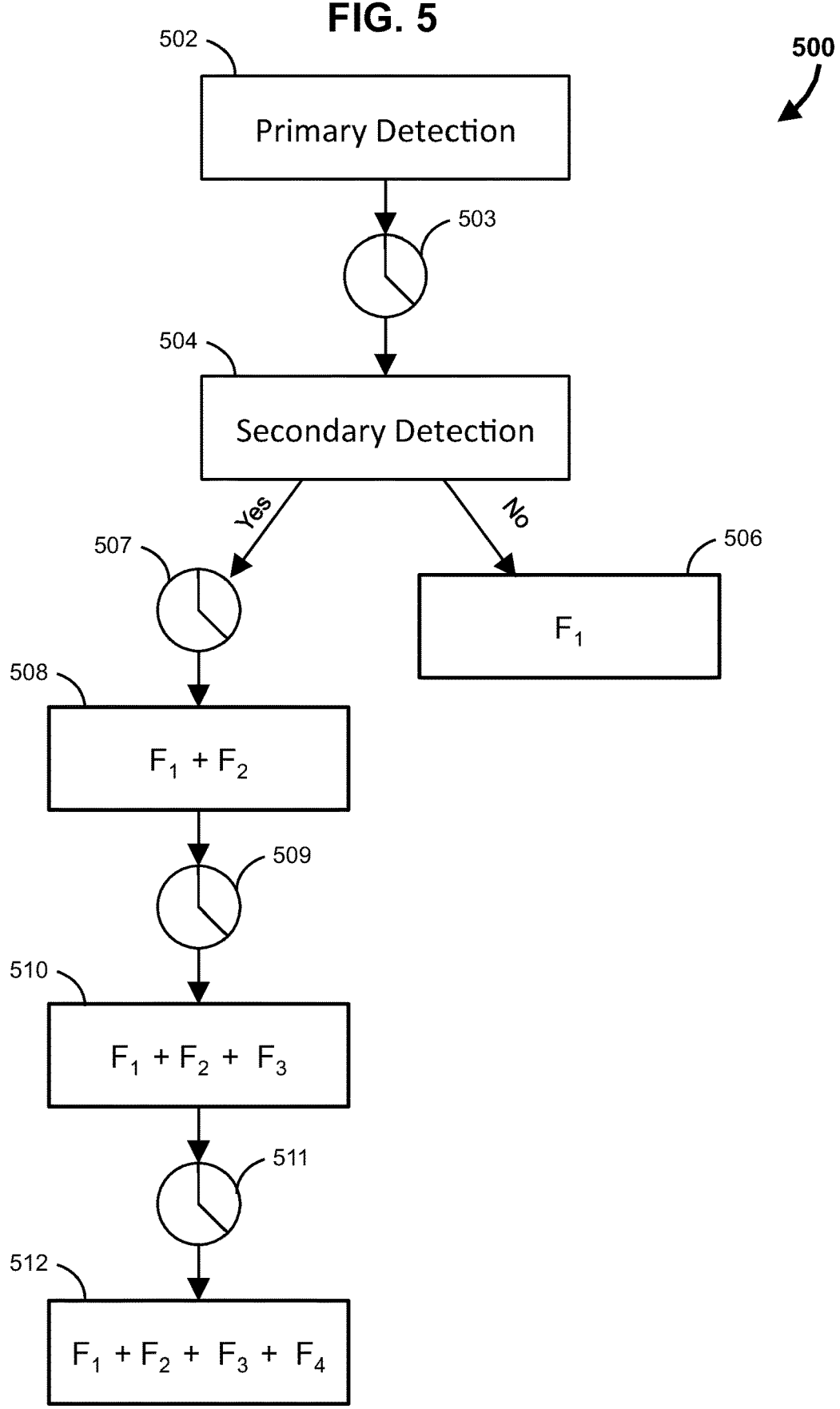
FIG. 5 is a block diagram of a method performed by the vehicle.

FIG. 5 shows an example method 500 of controlling safety systems of the vehicle 200 based on readings from the load sensors 301, 302 and the camera 303. The vehicle is configured to perform the method 500. As explained above, the vehicle includes software code (e.g., a safety program) resident on the volatile memory 107 and/or non-volatile memory 106. The processor 108 is configured to execute the safety program and thereby perform the method 500.

Each of the load sensors 301, 302 is in operative communication with the processor 108 and configured to transmit signals to the processor 108. The vehicle 200 is configured to detect or estimate mechanical load on various vehicle components based on the load sensors 301, 302. For example, the vehicle 200 may detect mechanical load on the seat bottom 213c based on load sensors 302c. The vehicle 200 may detect mechanical load on the back 213b based on load sensors 302b. The vehicle 200 may detect mechanical load on the dashboard 212 based on load sensors 301.

According to various embodiments, the load sensors 301, 302 are two-dimensional load sensors and are thus capable of reporting load in a horizontal direction and a vertical direction. According to various embodiments, the load sensors 301, 302 are one-dimensional load sensors. In these embodiments, the vehicle 200 may be configured to estimate two-dimensional load on various objects (e.g., the seat 213 or the dashboard 212) based on (a) the one-dimensional measurements and (b) the known positions of the load sensors (e.g., load sensed by load sensor 301c is only vertical, load sensed by load sensor 301a is only horizontal, load sensed by load sensor 302b has a vertical load component and a horizontal load component).

As stated above, various components of the vehicle 200 include multiple load sensors. For example, as shown in FIG. 4, and as previously discussed, the top panel 212a includes a plurality of rows and columns of load sensors 301a, 301b, 301c. According to various embodiments, the vehicle 200 is configured to compile or collect data from the load sensors (or select representative load sensors) and estimate a total or net load in one or both of the horizontal and vertical directions of each of the seat 213, the dashboard 212, and the floor 217.

For example, the vehicle 200 may estimate a vertical mechanical load on the dashboard 212 and a horizontal mechanical load on the dashboard 212 based on load sensors 301a, 301b, and 301c. Similarly, the vehicle may estimate a vertical mechanical load on the seat 213 and a horizontal mechanical load on the seat 213 based on load sensors 302a, 302b, and 302c. The vehicle may estimate a vertical mechanical load on the floor 217 based on load sensors 302d.

To find the net load on the component (i.e., the seat 213, the floor 217, and the dashboard 212), the vehicle 200 may sum the results of each load sensor (e.g., sum the vertical load component of sensors 301b and 301c to find the total vertical load on the dashboard 212). Alternatively, and as stated above, the vehicle may select a single load sensor as representative and equate mechanical load on the object to the load sensed by the single load sensor. Alternatively, the vehicle may apply various algorithms to estimate total mechanical load on an object based on signals from a plurality of load sensors.

Returning to FIG. 5, the vehicle makes or renders a primary detection at block 502. The primary detection may be rendered with reference to load determined by the load sensors 301 of the dashboard 212. According to various embodiments, a primary detection occurs when horizontal load on the dashboard 212 exceeds a first predetermined threshold and/or vertical load on the dashboard 212 exceeds a second predetermined threshold.

The predetermined thresholds may be set an manufacturing. According to various embodiments, the vehicle 200 is configured to enable the user or passenger, via the user interface 105, to set the predetermined thresholds. When doing so, the vehicle 200, via the user interface 105, instructs the user to remove all objects from (i.e., clean) the dashboard. The vehicle 200 then records the loading on the clean dashboard 212 and sets one or more baselines with reference to the recorded loading (e.g., sets a horizontal loading baseline and a vertical loading baseline). When the measured or detected loads exceed one or more of the baselines by a user-adjustable predetermined degree (e.g., 10% or 2 lbs), then the vehicle 200 renders the primary detection.

Upon rendering the primary detection at block 502, the vehicle waits a first predetermined amount of time 503 and then repeats the primary detection. If the primary detection is no longer present (i.e., if the predetermined threshold(s) are not exceeded), then the process ends. The first predetermined amount of time 503 compensates for a situation where a person only momentarily rests a foot, or other object, on the dashboard.

If the primary detection is still present after the first predetermined amount of time 503, the vehicle 200 proceeds to block 504. At block 504, the vehicle 200 makes or renders a secondary detection. The secondary detection confirms the validity or accuracy of the primary detection. The secondary detection can be performed according to a range methods (discussed below). The vehicle 200 may be configured to execute one, some, or all of these methods.

One method of secondary detection is via the camera 303. At block 504, the camera 303 records one or more new images of the top panel 212a of the dashboard 212. The camera 303 transmits these new images to the processor 303. The processor 303 compares the new images to a previously recorded clean image of the top panel 212a. The previously recorded clean image is a baseline image of the top panel 212a without any objects located thereon.

The clean image may be preloaded on the vehicle 200 at manufacturing. According to various embodiments, the vehicle 200 is configured to enable the user, via the user interface 105, to cause the camera 303 to record images, and then enable the user to select one of the recorded images as the clean image. This process is useful, for example, if the user permanently affixes an object to the dashboard.

The processor 303, via suitable programming compares the new images to the clean image. According to various embodiments, the processor 303 blurs or combines the new images into a single combined image (e.g., by averaging the pixel values of each of the images). The processor 303 then compares the combined image to the clean image. More specifically, the processor 303 aligns the combined image with the clean image (to account for camera offset or vibration). The processor 303 then compares pixel values of the combined image with the clean image. If a predetermined reference number of pixels of the combined image differ by a predetermined degree from the clean image, then the vehicle 200 renders the secondary detection at block 504. The predetermined reference number and the predetermined degree may be user adjustable.

Some pixel variation between the combined image and the clean image is expected due to light incident on the top panel 212a via the windshield 211. According to various embodiments, the vehicle 200 includes multiple clean images and associates each clean image with a certain time of day and/or weather condition. The vehicle 200 may apply a lookup table that associates a first range of light conditions (e.g., 50 to 55 lumens) with a first clean image, a second range of light conditions (e.g., 56 to 60 lumens) with a second clean image, etc. The light conditions may be measured by a suitable light sensor installed on the dashboard (e.g., a sensor that automatically activates the headlights during darkness).

Alternatively or in addition to the above pixel comparison process, the vehicle 200 may apply image or pattern recognition software to the new images. The vehicle 200, by executing the recognition software, recognizes foreign objects on the dashboard 212. When a foreign object is recognized on the dashboard 212, the vehicle 200 renders the secondary detection at block 504.

It should be appreciated that the secondary detection may be rendered at block 504 without reference to the camera 303 (e.g., in cases where the vehicle 200 does not include the camera 303). In such cases, the secondary detection may include one or more of the following: (a) detecting that a person presently occupies the seat 213 with reference to load sensors 302 and/or a seatbelt sensor; (b) detecting that a person occupying the seat 213 has redistributed his or her weight; (c) detecting that horizontal load on the seat 213 has increased over a user-adjustable predetermined horizontal loading value.

The vehicle 200 may be configured to perform (b) by tracking a maximum vertical load during a trip (or during predetermined time span within the trip) on the seat 213 and the floor 217. The vehicle 200 sets the sum of the vertical load on the seat 213 and the floor 217 as the passenger's weight. If the combined vertical load on the seat 213 and the floor 217 decreases during the trip (or the predetermined time span) by a predetermined load degree (e.g., more than 5% or 4 lbs), then the vehicle 200 may assume that the missing load was transferred to the dashboard 212 and thus render the secondary detection at block 504.

The vehicle 200 may be configured to perform (c) finding total or net horizontal load on the seat 213. When the detected horizontal load on the seat 213 increases over a predetermined value, the vehicle 200 assumes that the user has applied an equal and opposite horizontal load against the dashboard 212. The vehicle 200 thus renders the secondary detection.

It should be appreciated that any or all of the above secondary detection methods may be combined. It should be appreciated that any or all of the above secondary detection methods may be substituted for the primary detection at block 502. It should be appreciated that the primary detection at block 502 may be part of the secondary detection at block 504.

If, at block 504, the vehicle fails to render the secondary detection, then the vehicle proceeds to block 506, where the vehicle 200 implements a first function. If, at block 504, the vehicle 200 renders the secondary detection, then the vehicle waits a second predetermined amount of time 507. After the second predetermined amount of time 507, if the secondary detection of block 504 and/or the primary detection of block 502 are still present, then the vehicle 200 implements a second function at block 508.

After implementing the second function at block 508, the vehicle 200 waits a third predetermined amount of time 509. After the third predetermined amount of time 509, if the secondary detection of block 504 and/or the primary detection of block 502 are still present, then the vehicle 200 implements a third function at block 510.

After implementing the third function at block 510, the vehicle waits a fourth predetermined amount of time 511. After the fourth predetermined amount of time 511, if the secondary detection of block 504 and/or the primary detection of block 502 are still present, then the vehicle 200 implements a fourth function at block 512.

It should be appreciated that the predetermined times 503, 507, 509, 511 are optional and some or all of the predetermined times 503, 507, 509, 511 may be absent from the method 500. It should be appreciated that both of the primary detection and the secondary detection are continuously re-executed during all stages of the method 500.

It should be appreciated that the method 500 may terminate whenever the primary detection is no longer present (i.e., measured or sensed). For example, the method 500 may immediately terminate during the third predetermined amount of time 509, if the loads detected at load sensors 301 fail to satisfy the one or more thresholds (i.e., the primary detection becomes negative during one of the re-executions of the primary detection). It should further be appreciated that the method 500 may immediately skip or proceed to the first function of block 506 whenever the secondary detection is no longer present, but the primary detection is still present. For example, the method 500 may immediately skip from block 510 to block 506 if the secondary detection becomes negative during one of the re-executions of the secondary detection. It should be appreciated that the method 500, upon reaching block 512, remains at block 512 until either terminating with reference to the primary detection or skipping to block 506 with reference to the secondary detection. It should be appreciated that skipping from blocks 508, 510, or 512 to block 506 causes the vehicle 200 to end functions (e.g., the second function, the third function, and the fourth function) other than the first function.

According to various embodiments, each function causes the vehicle 200 to perform some or all of the following: activating a warning light on the user interface 105, issuing warning text or video via the user interface 105, generating a sound or noise via the user interface 105, vibrating some or all of the seat 213, and disabling the front passenger airbag 304. As stated above, the front passenger airbag 304 may represent a plurality of airbags positioned around the seat 213. The disabling of the front passenger airbag 304 may include disabling all, or only some of the plurality of airbags. It should be appreciated that each function may include a different set of the above features.

As shown in FIG. 5, the functions may be cumulative over time. Put differently, block 508 may include the second function in addition to the first function of block 506. Block 510 may include the first, second, and third functions. Block 512 may include the first, second, third, and fourth functions.

According to various embodiments, the first function is the activation of a warning light on the user interface 105. The second function is the sound broadcast by speakers of the user interface 105. The third function is the induced vibration of some or all of the seat 213. The fourth function is the deactivation of the passenger airbag 304 accompanied by an activation of a supplementary warning light and/or supplementary text displayed on the user interface 105.

The invention claimed is:

1. A vehicle comprising:
a dashboard with load sensors and airbag(s), a seat, processor(s) configured to:
(a) detect a first load on the dashboard,
(b) determine that the first load exceeds a predetermined load,
(c) detect, subsequent to a first predetermined amount of time since (b), a second load on the dashboard,
(d) determine that the second load exceeds the predetermined load,
(e) disable the airbag(s) based on (b) and (d).

2. The vehicle of claim 1, wherein the processor(s) are further configured to:
(f) detect, subsequent to a second predetermined amount of time since (d), a third load on the dashboard;
(g) determine that the third load exceeds the predetermined load; and
(h) based on (b), (d) and (g), perform at least one of:
causing a user interface to generate a warning light, or
causing the user interface to generate a warning video.

3. The vehicle of claim 1, wherein some of the load sensors are arranged to detect the first load or the second load in a horizontal direction and some of the load sensors are arranged to detect the first load or the second load in a vertical direction.

4. The vehicle of claim 3, wherein the processor(s) are configured to: perform (a) or (c) by: determining a horizontal load of the first load or the second load on the dashboard and a vertical load of the first load or the second load on the dashboard.

5. The vehicle of claim 4, wherein the processor(s) are configured to:
compare the determined vertical load of the first load or the second load to a first threshold and compare the determined horizontal load of the first load or the second load to a second threshold; and
perform (e) based on (b) and (d) by at least one of: determining that the determined vertical load of the first load and the determined vertical load of the second load exceed the first threshold, determining that the determined horizontal load of the first load and the determined horizontal load of the second load exceed the second threshold, determining that the determined vertical load of the first load exceeds the first threshold and the determined horizontal load of the second load exceeds the second threshold, or determining that the determined horizontal load of the first load exceeds the second threshold and the determined vertical load of the second load exceeds the first threshold.

6. The vehicle of claim 1, wherein the vehicle comprises a camera pointed at the dashboard and the processor(s) are configured to:
(f) detect, subsequent to a second predetermined amount of time since (d), one or more first images via the camera;
determine one or more differences between the one or more first images and a baseline image; and
(g) determine presence of an object on the dashboard based on the one or more differences.

7. The vehicle of claim 6, wherein the processor(s) are configured to:
perform (e) based on (b), (d) and (g).

8. The vehicle of claim 7, wherein the vehicle comprises a light sensor and the processor(s) are configured to: process the one or more first images from the camera based on an amount of light sensed by the light sensor.

9. The vehicle of claim 8, wherein the processor(s) are configured to: process the one or more first images from the camera based on an amount of light sensed by the light sensor by processing the one or more first images with an algorithm selected based on the amount of light sensed by the light sensor.

10. The vehicle of claim 6, wherein the processor(s) are further configured to:
(h) detect, subsequent to a third predetermined amount of time since (g), one or more second images via the camera;
determine one or more differences between the one or more second images and the baseline image;
(i) determine the presence of the object on the dashboard based on the one or more differences; and
(j) based on (g) and (i), perform at least one of: causing a user interface to generate a warning light, or causing the user interface to generate a warning video.

11. The vehicle of claim 6, wherein determining one or more differences between the one or more first images and a baseline image comprises:
combining the one or more first images into a combined image; and
determining that a predetermined reference number of pixels of the combined image differ by a predetermined degree from the baseline image.

12. The vehicle of claim 6, wherein the baseline image comprises one or more clean images, each clean image associated with a range of light conditions, and wherein determining one or more differences between the one or more first images and the baseline image comprises:
determining one or more light conditions for each of the one or more first images;
selecting one or more clean images associated with each of the one or more first images based on the one or more light conditions; and
determining one or more differences between each of the one or more first images and respective selected one or more clean images.

13. A method comprising, via processor(s) of a vehicle including a dashboard with load sensors, a seat, and airbag (s):
(a) detecting a first load on the dashboard,
(b) determine that the first load exceeds a predetermined load,
(c) detect, subsequent to a first predetermined amount of time since (b), a second load on the dashboard,
(d) determine that the second load exceeds the predetermined load,
(e) disabling the airbag(s) based on (b) and (d).

14. The method of claim 13, comprising:
(f) detecting, subsequent to a second predetermined amount of time since (d), a third load on the dashboard;
(g) determining that the third load exceeds the predetermined load; and
(h) based on (b), (d), and (g), performing at least one of: causing a user interface to generate a warning light, or causing the user interface to generate a warning video.

15. The method of claim 13, comprising:
(f) detecting, subsequent to a second predetermined amount of time since (d), one or more first images via a camera;
determining one or more differences between the one or more first images and a baseline image;
(g) determining presence of an object on the dashboard based on the one or more differences; and
performing (e) based on (b), (d) and (g).

16. The method of claim 15, wherein the presence of the object on the dashboard is determined via image filtering software that relies on an amount of light detected by a light sensor of the vehicle.

* * * * *